United States Patent [19]

Liebert et al.

[11] 4,290,738

[45] Sep. 22, 1981

[54] STEERING VALVE WITH SPRING TORSION ROD

[75] Inventors: Karl-Heinz Liebert, Schwabisch Gmund; Werner Tischer, Bobingen, both of Fed. Rep. of Germany

[73] Assignee: Zahnradfabrik Friedrichshafen, AG., Friedrichshafen, Fed. Rep. of Germany

[21] Appl. No.: 73,611

[22] Filed: Sep. 10, 1979

[30] Foreign Application Priority Data

Mar. 14, 1978 [DE] Fed. Rep. of Germany ....... 2810970

[51] Int. Cl.³ .......................... F01C 1/10; F16D 31/04
[52] U.S. Cl. ..................................... 418/61 B; 60/384
[58] Field of Search ................ 418/61 B; 60/384, 386; 180/132; 91/375 R, 375 A, 467

[56] References Cited

U.S. PATENT DOCUMENTS 3,597,128  8/1971  Venable et al. ................... 418/61 B
3,957,129  5/1976  Rau ....................................... 60/384
4,060,146  11/1977  Goscenski, Jr. ................... 91/375 A
4,144,712  3/1979  Termansen ............................ 60/384

OTHER PUBLICATIONS

*ZF-Servostat, Hydrostatic Power Steering Type Series 8440 to 8455*, Zahnradfabrik Friedrichshafen AG, Germany, 1974.

*Primary Examiner*—John J. Vrablik
*Attorney, Agent, or Firm*—Zalkind & Shuster

[57] ABSTRACT

A torsion rod is provided with articulated connections at opposite ends to transmit torque between a steering spindle and the universal shaft coupling of a pump rotor in a steering control valve. The end of the torsion rod coupled to the universal shaft is received in a bore that terminates close to the driven end of the universal shaft engaged with the pump rotor, the articulated connection to the torsion rod being located at said terminal end of the bore.

4 Claims, 5 Drawing Figures

STEERING VALVE WITH SPRING TORSION ROD

BACKGROUND OF THE INVENTION

This invention relates to a steering control valve of the type associated with a hydrostatic vehicle steering system.

A steering valve of the foregoing type is disclosed in a publication of the assignee of the present application, entitled "ZF-ROSS SERVOSTAT HYDROSTATIC STEERING, TYPE SERIES 8450 to 8455", of December 1975. Such hydrostatic steering systems are useful for relatively slow moving vehicles such as forklifts, tractors and combines to avoid the problems associated with mechanical steering connections. Hydrostatic steering systems are also useful for navigation of ships. Associated with the prior art steering control valve in such systems is a manually operable pump which acts to meter the flow of fluid from a high pressure pump during normal operation, the pump also operating as the pressure source in the event of high pressure pump failure.

To facilitate steering operation, the slide valve element associated with the steering control valve must be slidably mounted within the valve body with the least possible friction. Frictional resistance can only be minimized if radial forces pressing the slide valve element against the slide bearing surfaces of the valve body are avoided. Radial forces not only decrease any radial clearance between the valve element and the valve body, but also creates additional frictional pressure because of the prevailing fluid pressure differential between the various valve passages of the steering control valve. Thus, direct contact may occur between the valve element and the valve body to displace operating fluid and thereby result in high frictional loading. Angular displacement of the hand steering wheel from a rest position is therefore impeded by a high static frictional resistance. Such jamming of the valve element in the rest condition can only be overcome by a relatively high turning force applied to the hand steering wheel which must be abruptly reduced because of the transition to a lower sliding frictional resistance during continued turning of the hand steering wheel. Operation of the steering control valve is therefore characterized by uneven steering and poor sensing of road conditions.

The undesirable radial forces hereinbefore referred to are exerted on the slide valve element of prior art steering control valves because of two reasons. First, the driving torque applied to the steering spindle is transmitted to one end of a cylindrical torsion rod pinned to the spindle at one end of a bore formed in a drive shaft extension of the spindle. Because of manufacturing imperfections and clearances in the pinned connection, there is some misalignment between the axes of the torsion rod and the drive shaft. Axial loading will therefore bend the torsion rod causing it to exert a radial force on the valve element. The other end of the torsion rod is pinned to one end of a universal shaft at the same axial location at which the universal shaft is in driving engagement with the slide valve element in accordance with prior art arrangements. Since the drive shaft axis is always at some angle to the axis of the universal shaft, additional radial forces are exerted on the valve element as the other driven end of the universal shaft rotates eccentrically with the pump rotor to which it is drivingly coupled. The torque loading of the drive shaft and universal shaft are so angularly related as to establish a lateral reaction torque component which has the effect of tilting the slide valve element about an axis transverse to its longitudinal axis causing opposite ends of the valve element to engage the valve body within the bore slidably mounting the valve element.

It is therefore an important object of the present invention to provide a steering control valve for hydrostatic vehicle steering systems wherein undesirable radial forces on the slide valve element are substantially eliminated in the rest position of the hand steering wheel and minimized during transmission of driving torque.

SUMMARY OF THE INVENTION

In accordance with the present invention, a steering control valve for a hydrostatic steering system is provided for actuating the manually operable flow metering pump. The steering control valve includes a slidable valve element, a drive shaft, a universal coupling shaft having a driven end pivotally and torsionally connected to the pump rotor, a spring torsion rod coupled at one end to the rotor through the universal shaft and at the other end to the drive shaft, and means responsive to torsional strain of the torsion rod for axially displacing the slide valve element relative to the drive shaft. Axial bores extend into the drive and universal shafts enclosing the torsion rod which is provided with articulated connections at opposite ends to the drive and universal shafts. The axial bore in the universal shaft terminates in close spaced adjacency to its driven end in driving engagement with the eccentrically rotated pump rotor.

Inasmuch as the torsion rod has an articulated connection with the drive shaft, it acts as a hinge supported bar that does not transmit any radial forces. Since the torsion rod extends as far as possible into the universal shaft through its bore and is torsionally coupled thereto at the driven end, the lateral reaction torque component aforementioned which arises during torque transmission will to a major extent be transmitted to and absorbed by the rotor of the manually operable metering pump. Only a very small portion of such lateral reaction torque will be imparted to the slide valve element to render the lateral reaction torque component virtually ineffective on the slide valve element. Accordingly, virtually no radial forces are exerted on the slide valve element capable of causing bind or pivotal jamming of the slide valve element in its bore within the valve body of the steering control valve.

The articulated connection between the torsion rod and the universal shaft in close adjacency to its driven end within the rotor of the manually operable metering pump, results in the lateral reaction torque component being harmlessly applied to the pump rotor and relieves the slide valve element of such reaction torque and the radial forces resulting therefrom. The articulated connections between the torsion rod and the drive and universal shafts is established by driving pins extending across the bores in the shafts at their remotely spaced ends, the driving pins being embraced by fork shaped ends of the torsion rod which is simply assembled by axial insertion into the bores of the drive and universal shafts.

BRIEF DESCRIPTION OF THE DRAWING FIGURES

A preferred embodiment of the invention will be explained hereinafter with reference to the accompanying drawings, in which.

DETAILED DESCRIPTION OF PREFERRED EMBODIMENT

Figure 1:
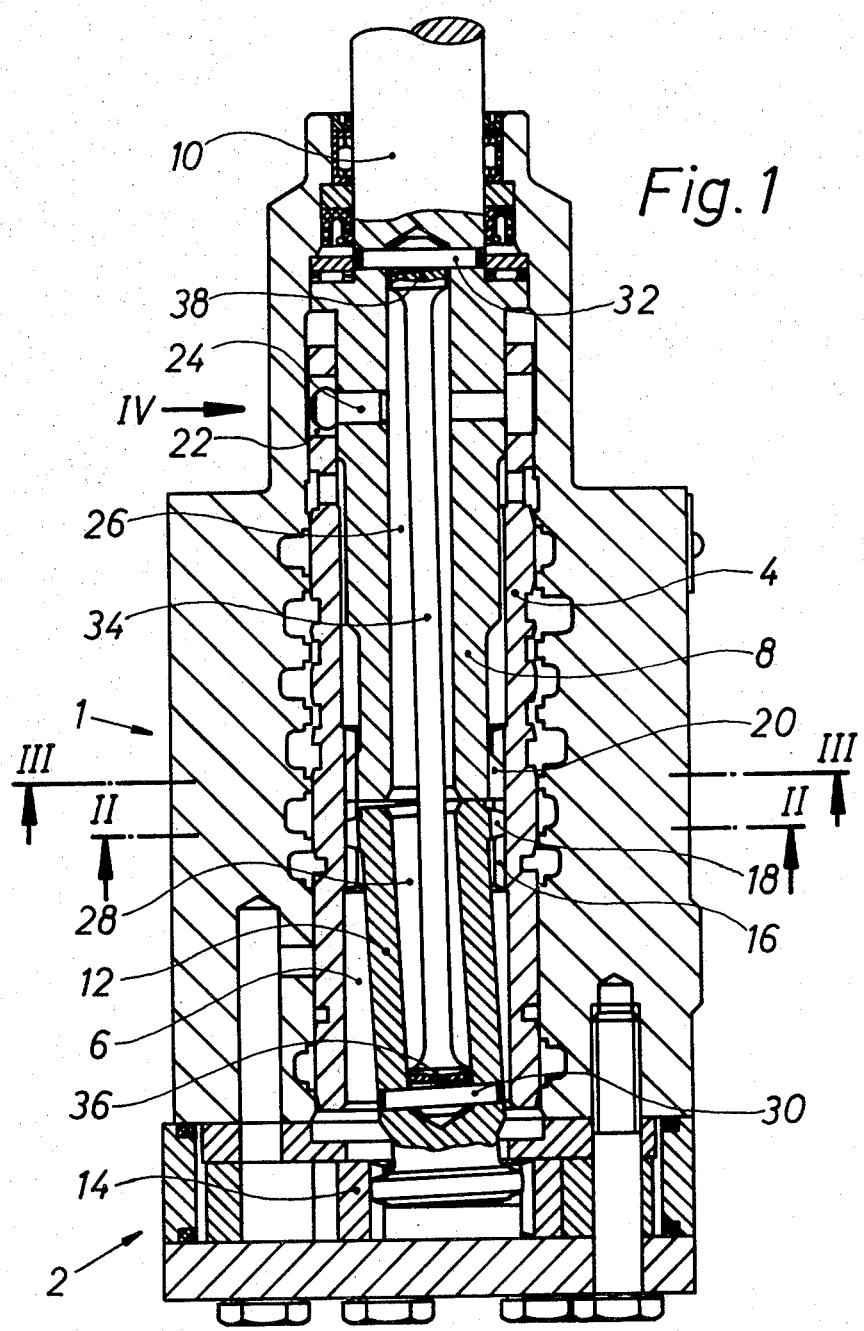
FIG. 1 is a longitudinal section view through one embodiment of a steering control valve in accordance with the present invention.

Referring now to the drawings in detail, FIG. 1 illustrates a steering control valve generally referred to by reference numeral 1 associated with a hydrostatic valve steering system of a generally well known type as aforementioned. Firmly attached to the valve body of the steering control valve is a manually operable metering pump assembly which is also of a generally well known type and generally denoted by reference numeral 2 in FIG. 1. The control valve body has a bore formed therein which slidably mounts a slide valve element 4 which in turn encloses an inner cylindrical chamber 6 into which a steering spindle 10 extends from a hand steering wheel (not shown). A universal coupling shaft 12 is in driving engagement at one axial end thereof with the slide valve element within chamber 6 and at its other driven end in driving engagement with an eccentrically rotated rotor 14 of the pump assembly 2 to establish a torsional and articulated connection between the slide valve element 4 and the rotor 14 in a manner well known in the art.

Figure 2:
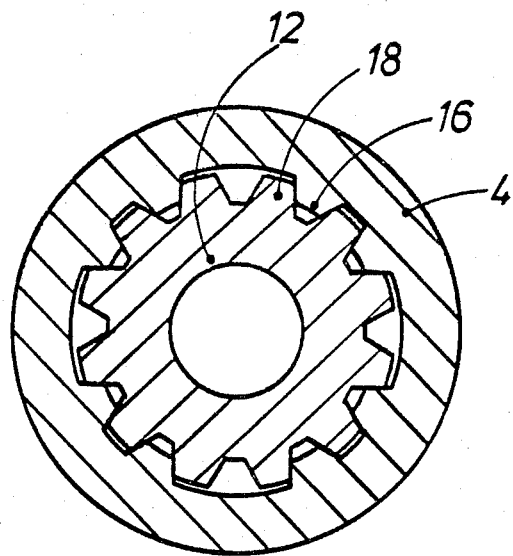
FIG. 2 is a transverse section view taken substantially through a plane indicated by section line II—II in FIG. 1.
Figure 3:
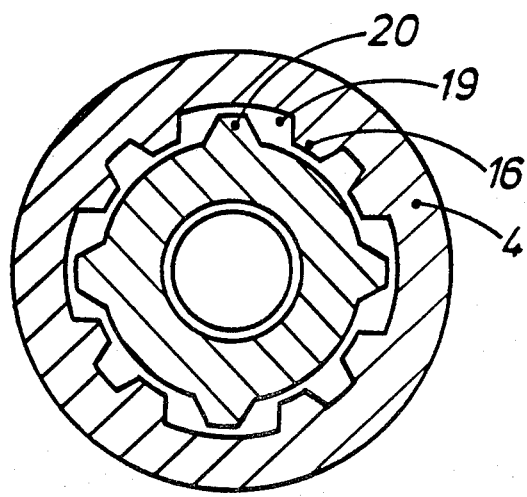
FIG. 3 is a transverse section view taken substantially through a plane indicated by section line III—III in FIG. 1.

As more clearly seen in FIGS. 2 and 3, the valve element 4 has internal gear teeth 16 in meshing engagement with external teeth 18 at the end of the universal shaft 12 so that the slide valve element rotates with the universal shaft. A drive shaft extension 8 of the steering spindle 10, on the other hand, has external cam formations 20 located at the end of the drive shaft adjacent the universal shaft 12. The cam formations 20 are received in relatively wide gaps 19 formed between the internal teeth 16 of the slide valve element 4. Accordingly, the drive shaft extension 8 may undergo limited angular displacement relative to the valve element 4 before any torque is transmitted thereto.

Figure 4:
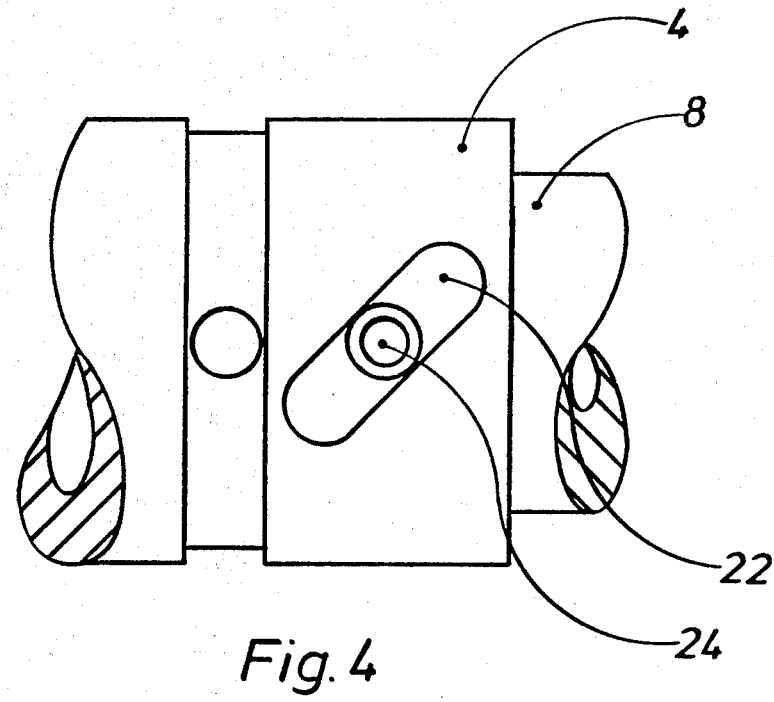
FIG. 4 is a top plan view of a portion of the slide valve element of the steering control valve at a location indicated by arrow 4 in FIG. 1.

As shown in FIG. 4, the slide valve element 4 is provided with a diagonal slot 22 which acts as a cam engaged without clearance by a drive pin 24 secured to the spindle extension drive shaft 8. The extension shaft 8 has a bore 26 formed therein coaxially with its longitudinal axis while a coaxial bore 28 is formed in the universal shaft 12. At the ends of the bores 28 and 26 remote from each other, driving pins 30 and 32 are respectively anchored to the universal shaft 12 and the drive shaft spindle 10. The driving pins are embraced without clearance by fork shaped ends 36 and 38 of a torsion spring rod 34. Thus, the rotor 14 of the pump assembly which is loaded by the dirigible wheels of a vehicle, is drivingly coupled through universal shaft 12 and torsion rod 34 to the steering spindle 10.

Whenever a driving torque is applied to the spindle opposed by the resistance of the steered wheels of the vehicle acting on the pump rotor 14, the torsion rod undergoes torsional strain while transmitting the driving torque to the rotor through universal shaft 12 tending to displace the rotor from its central position, in accordance with well known steering control valve operation in a hydrostatic steering system. The valve element 4 is then axially shifted by the drive pin 24 on the spindle extension 8 engaged in the slot 22 in order to control the flow of fluid through the valve passages (not shown) in a manner well known in the art. The cam projections 20 at the end of the drive shaft extension 8 limit relative angular displacement between spindle 10 and the valve element 4 in order to protect the torsion rod 34 from excessive twist. Torque directly applied to the valve element 4 through the cam projections 20 is transmitted through the meshing gear teeth 16 and 18 and universal shaft 12 to the rotor 14.

Figure 5:
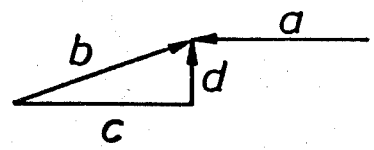
FIG. 5 is a vector diagram illustrating a vector analysis of torque conditions during operation of the steering control valve.

Because of the articulated connections at the ends of the torsion rod 34, bending under axial loading is prevented to avoid the application of radial forces on the valve element 4. During turning movement of the steering spindle 10 under a driving torque in a direction opposed by a resisting torque acting on rotor 14, a driven torque is applied to universal shaft 12 in alignment with its longitudinal axis. The vector diagram of FIG. 5 depicts the driving torque a and driven torque b respectively transmitted by the drive shaft spindle 10 and applied to the universal shaft 12. By vector addition, the driven torque b is the resultant of a torque component c of equal magnitude and in the same direction as the driving torque a, and a perpendicular reaction torque component d. The reaction torque component d has the effect of laterally displacing the universal shaft 12 about an axis transverse to its longitudinal axis at its articulated connection 30 to the torsion rod through which driving torque is directly applied. Since the torsion rod 34 is connected to the universal shaft 12 adjacent its left end as viewed in FIG. 1, the reaction torque component at such location exerts a radial force on the rotor 14. Any radial force also exerted on the valve element 4 is reduced to approximately one-fifth of that exerted on rotor 14 because of the leverage relationship established by the left end location of the torsion rod connection to the universal shaft in close adjacency to the rotor engaged driven end of the universal shaft. Thus, a major portion of the radial force produced during torque transmission is rendered ineffective on the slide valve element 4. The radial force exerted on the slide valve element is further reduced by extending the bore 28 in the universal shaft to a terminal end close to the driven end of the universal shaft at which it is geared to the rotor 14.

What is claimed is:

1. For use in a hydrostatic vehicle steering system having a pump (2) provided with a rotor (14), a steering control valve (1) for actuating the pump including a pump element (4), a drive shaft (10), a universal shaft (12) having a driven end pivotally and torsionally connected to the rotor, a spring torsion rod (34) having opposite ends coupled to the universal shaft and the drive shaft, and means (22, 24) responsive to torsional strain of the torsion rod for angularly displacing the valve element relative to the drive shaft; the improvement residing in articulated connecting means (32 and 30) for coupling said opposite ends (36 and 38) of the torsion rod to the drive shaft and said driven end of the universal shaft to minimize transmission of unbalanced radial forces to the valve element through the universal shaft.

2. The steering valve as defined in claim 1 wherein said universal shaft is provided with a bore (28) through which the torsion rod extends toward said driven end.

3. The steering valve as defined in claim 2 wherein said drive shaft has an axial bore (26) formed therein, said bores (26, 28) in the universal and drive shafts having ends remote from each other, and drive pins (30, 32) extending through the bores at said remote ends thereof, the ends (36, 38) of the torsion rod being fork shaped to embrace the drive pins within the bores.

4. In a steering control valve including a valve body mounting a slidable valve element (4) coupled to one axial end of a universal shaft (12) having an opposite driven end engaged with an eccentrically rotatable pump rotor (14), a drive spindle (10), a torsion rod (34) torsionally coupling the drive spindle to the universal shaft, and means (22, 24) for axially shifting the valve element in response to torsional strain of the torsion rod; the improvement residing in means for minimizing radial forces exerted on the valve element including articulating hinge means (30–36, 32–38) torsionally coupling opposite ends (36, 38) of the torsion rod respectively to the drive spindle and to the universal shaft in axially spaced relation to said one axial end of the universal shaft, the hinge means (30–36) at one (36) of said ends of the torsion rod being in close adjacency to the driven end of the universal shaft engaged with the pump rotor.

* * * * *